United States Patent [19]

Jones, Jr.

[11] Patent Number: 4,528,587
[45] Date of Patent: Jul. 9, 1985

[54] THREE-DIMENSIONAL VIDEO APPARATUS AND METHODS USING COMPOSITE AND MIXED IMAGES

[75] Inventor: Edwin R. Jones, Jr., Columbia, S.C.

[73] Assignee: CJM Associates, Chapin, S.C.

[21] Appl. No.: 437,473

[22] Filed: Oct. 28, 1982

[51] Int. Cl.³ .............................................. H04N 9/54
[52] U.S. Cl. ........................................ 358/92; 358/89
[58] Field of Search ...................... 358/88, 89, 92, 91; 352/57, 62, 63

[56] References Cited

U.S. PATENT DOCUMENTS

| | | | |
|---|---|---|---|
| 904,212 | 11/1908 | Moran . | |
| 986,163 | 3/1911 | Giordano . | |
| 1,247,646 | 11/1917 | Craig . | |
| 1,259,365 | 3/1918 | Cooper | 352/59 |
| 1,267,689 | 5/1918 | Norton | 352/62 |
| 1,371,438 | 3/1921 | Prucha . | |
| 1,477,541 | 12/1923 | Clement et al. | 352/62 |
| 2,050,826 | 8/1936 | Bloxsom | 352/59 |
| 2,107,464 | 2/1938 | Zworykin . | |
| 2,158,660 | 5/1939 | Kanolt . | |
| 2,168,273 | 8/1939 | Sauer et al. . | |
| 2,270,198 | 1/1942 | Schensted . | |
| 2,273,512 | 2/1942 | Caldwell et al. . | |
| 2,279,443 | 4/1942 | Chanosky . | |
| 2,313,561 | 3/1943 | Mainardi et al. . | |
| 2,403,733 | 7/1946 | Mainardi et al. . | |
| 2,460,864 | 2/1949 | Whiteley . | |
| 2,566,700 | 9/1951 | Goldsmith . | |
| 2,693,128 | 11/1954 | Dewhurst . | |
| 3,019,698 | 2/1962 | Sheldon . | |
| 3,020,341 | 2/1962 | Owens . | |
| 3,275,745 | 9/1966 | Var | 358/92 |
| 3,418,044 | 12/1968 | Sheldon . | |
| 3,457,364 | 7/1969 | Carrillo | 358/92 |
| 3,595,995 | 7/1971 | Hobrough | 250/358 |
| 3,608,457 | 9/1971 | Barker | 354/112 |
| 3,626,404 | 12/1971 | Ophir | 340/703 |
| 3,705,261 | 12/1972 | Langley | 358/88 |
| 3,991,266 | 11/1976 | Baer | 358/146 |
| 4,006,291 | 2/1977 | Imsand | 358/92 |
| 4,303,316 | 12/1981 | McElveen | 352/57 |
| 4,393,400 | 7/1983 | Ikushima et al. | 358/92 |
| 4,399,456 | 8/1983 | Zalm | 358/92 |

FOREIGN PATENT DOCUMENTS

| | | |
|---|---|---|
| 54-55114 | 2/1979 | Japan . |
| 7831 | of 1914 | United Kingdom . |
| 888317 | 1/1962 | United Kingdom . |

OTHER PUBLICATIONS

M. Schubin, "Solid Television: 3-D For The One Eyed?", Videography, Jun. 1980, pp. 59-62.
J. L. Linback, "Other Third-Dimensional Systems," Four Aspects of Film, Chapters 1-4, pp. 139-182, 1968.
T. Okoshi I, "Three-Dimensional Displays," Proceedings Of The IEEE, vol. 68, No. 5, pp. 548-564, May 1980.
T. Okoshi II, "Three-Dimensional Imaging Techniques," pp. 56-59, and 394-395, Academic Press, 1976.
I. Hadani et al., "Visual Stability and Space Perception in Monocular Visions: Mathematical Model," J. Opt. Soc. Am., vol. 70, pp. 60 & 65, Jan. 1980.
B. Julesz I, "Foundations of Cyclopean Perception," pp. 2, 3, 16, 19, 20, 21, 143-149, 183, 184, 185, 222, 223, 253, 254, University of Chicago Press, 1971.
B. Julesz II, "Cooperative Phenomena in Binocular Depth Perception," American Scientist, vol. 62, pp. 32-43, Jan.-Feb., 1974.
"The Focal Encyclopedia of Film and Television Techniques," pp. 594, 673, 753, and 775-782, Hastings House, 1969.
"Effect of Vertical Disparity Upon Stereoscopic Depth," Vision, Res. vol. 18, pp. 351-352, 1978.
Pavlista, Sharon, "3-D Camera Odyssey in the Home Stretch," Venture, Oct. 1980, pp. 78 and 80.
File History of U.S. patent application Ser. No. 308,209 of Imsand.

*Primary Examiner*—John C. Martin
*Assistant Examiner*—Edward L. Coles
*Attorney, Agent, or Firm*—Finnegan, Henderson, Farabow, Garrett & Dunner

[57] ABSTRACT

The illusion of three-dimensional images is achieved by having a first video camera oriented to view the subject from one point of origin, a second video camera oriented to view the subject from another point of origin, a switching device for alternately coupling first and second series of composite picture frames to a display device including a viewing surface for converting the signals at the output terminal into a visual display on the viewing surface. A composite picture frame includes a first field corresponding to the output of the first video camera and a second field corresponding to the output of the second video camera. A special effects generator can be included to mix the output of the switching device with either the output of the first camera or the second camera to generate a image having a substantial and continuously present component of the images produced thereby.

18 Claims, 12 Drawing Figures

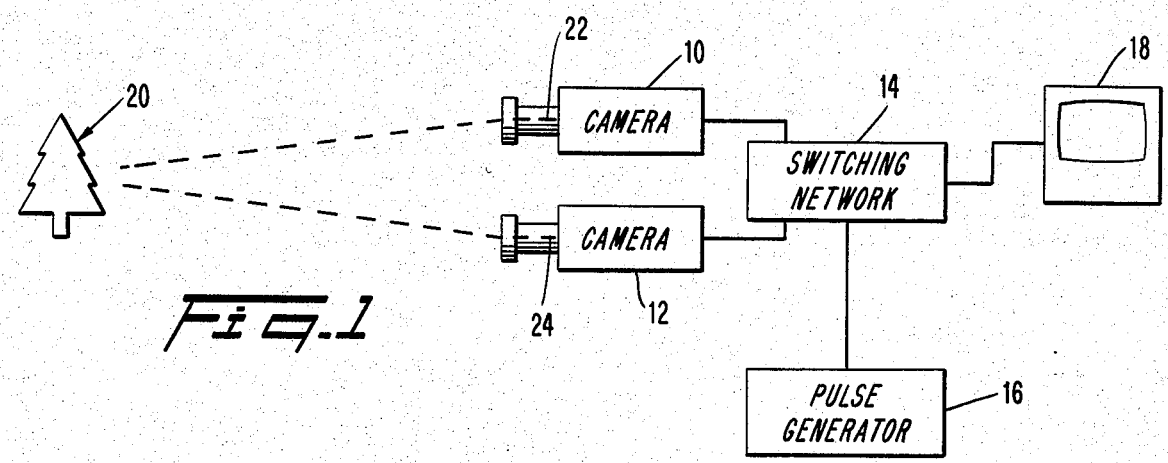
Fig. 1
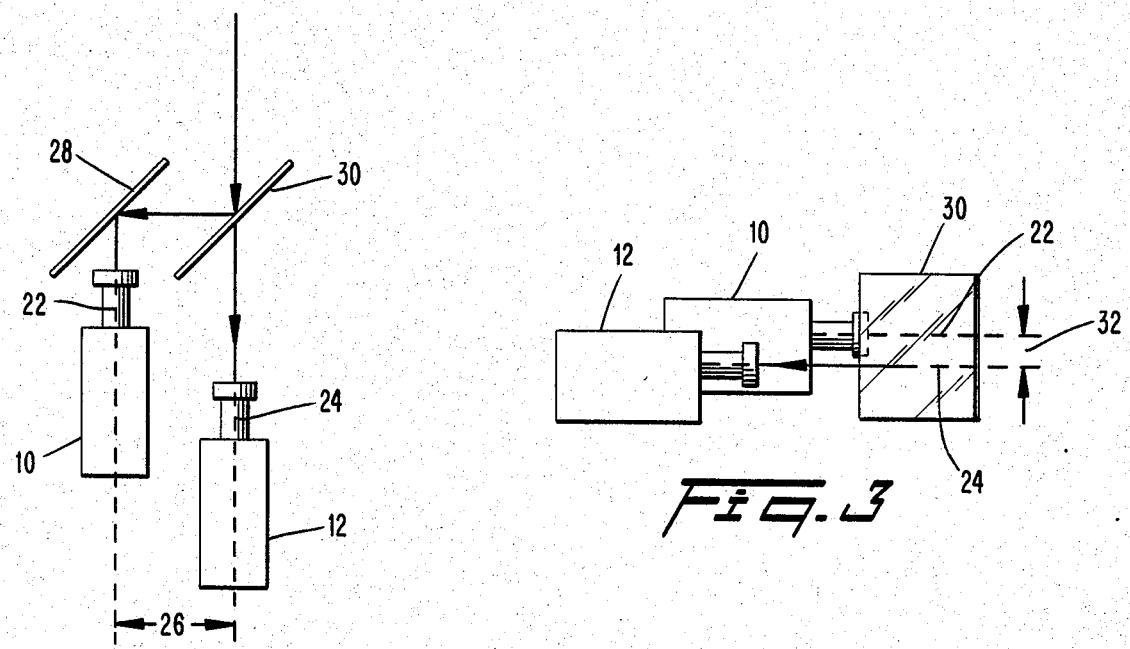
Fig. 3
Fig. 2
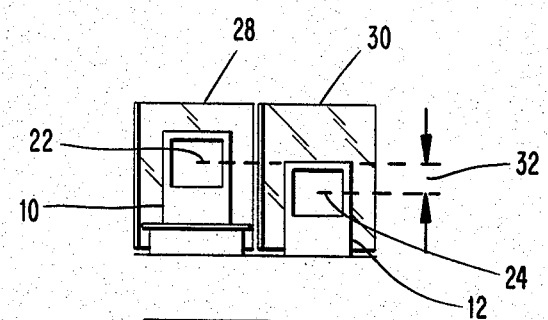
Fig. 4

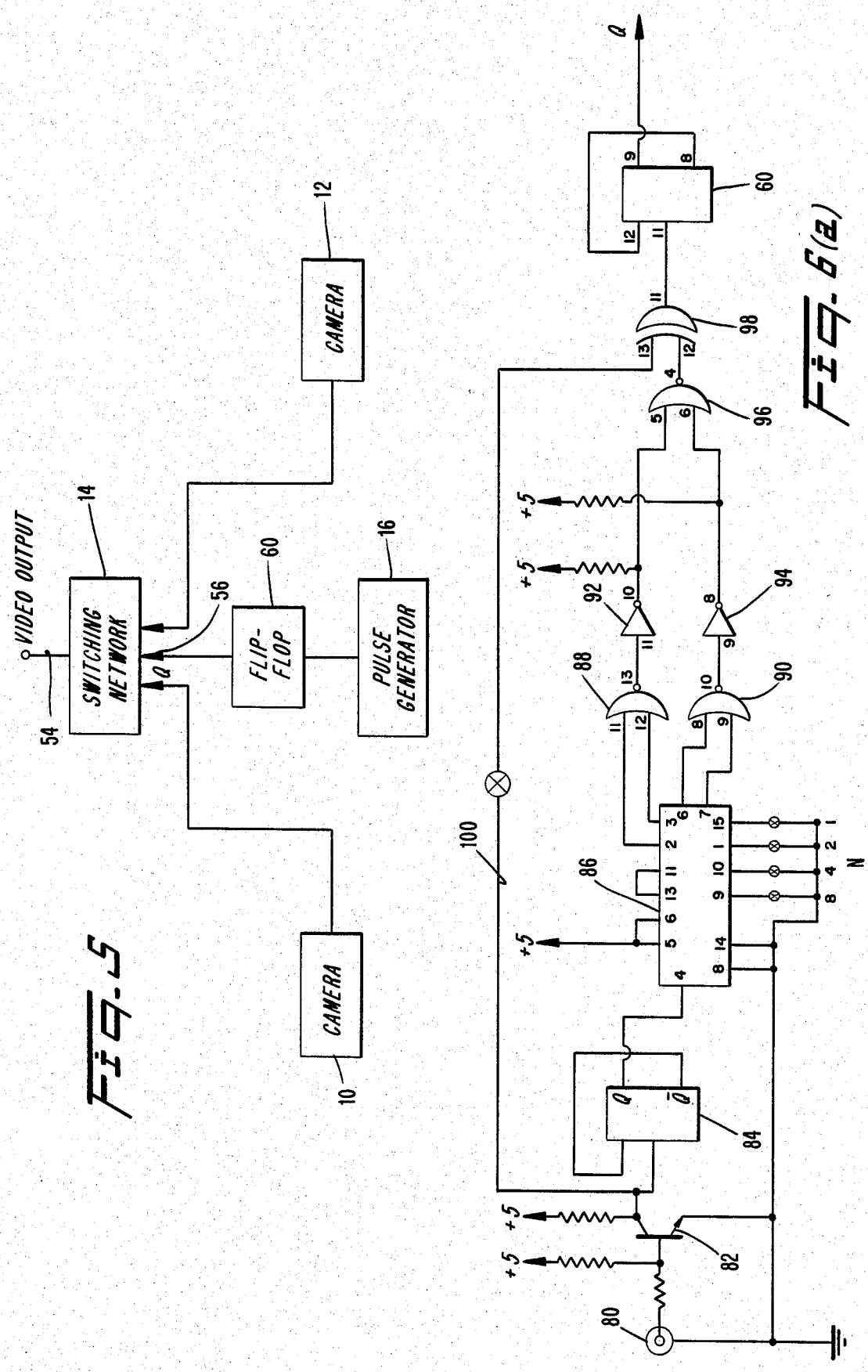

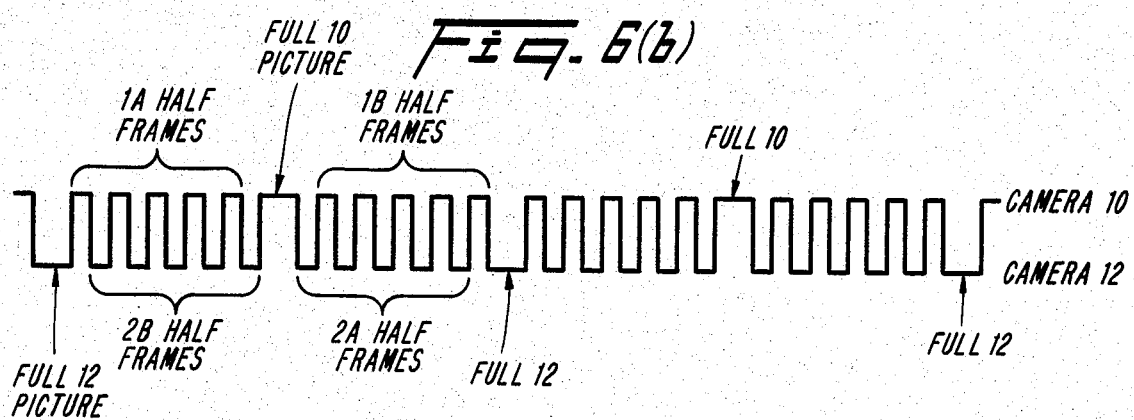
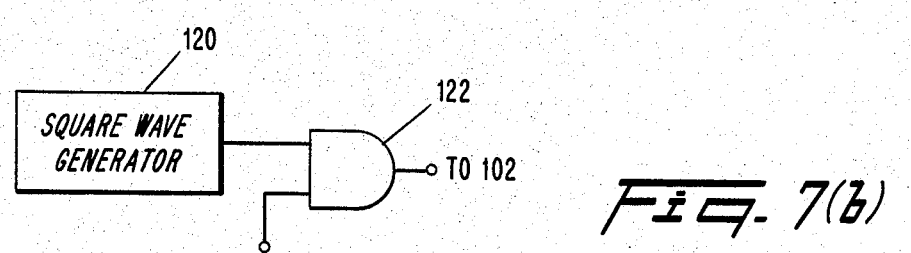
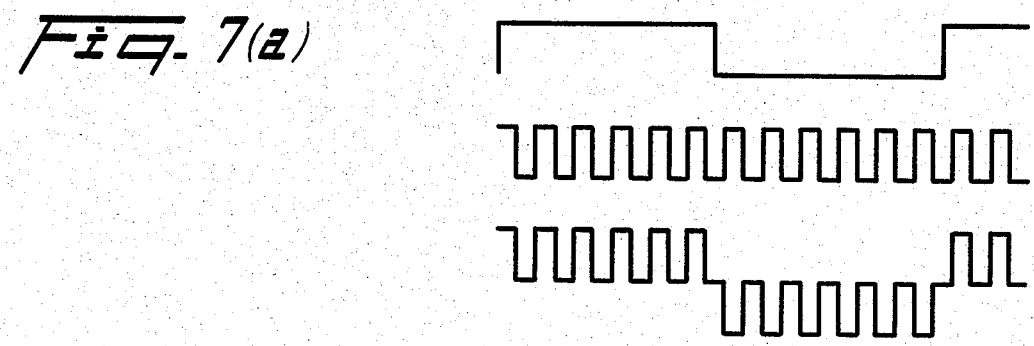
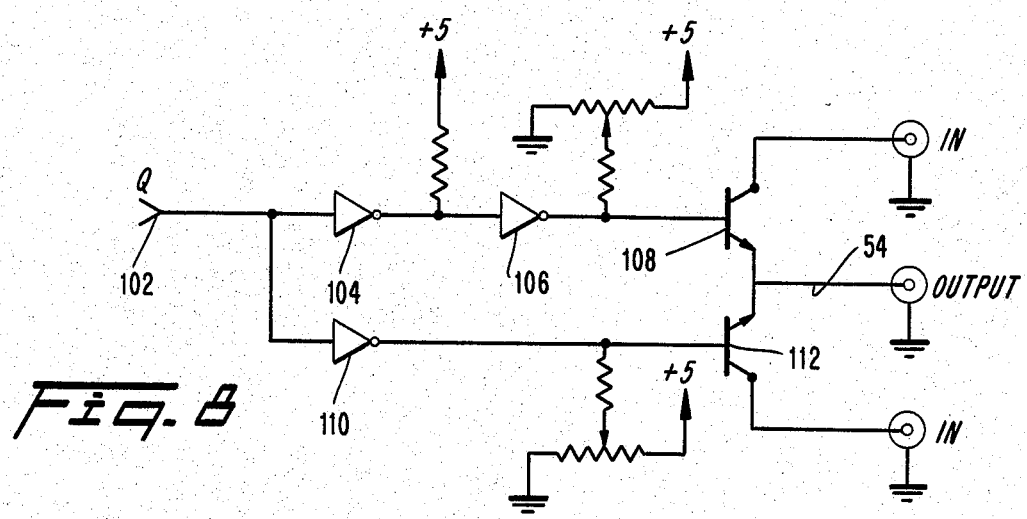

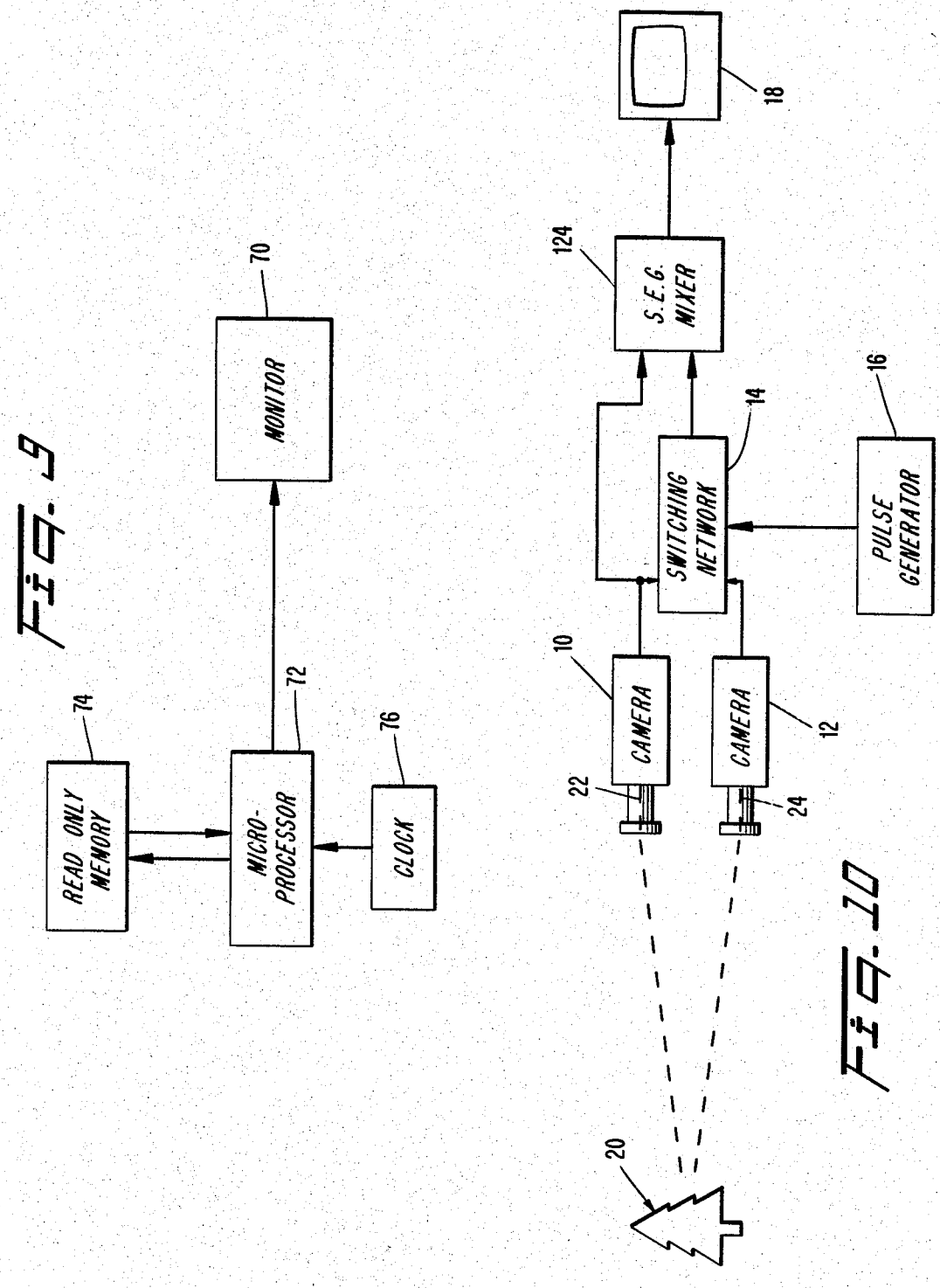

THREE-DIMENSIONAL VIDEO APPARATUS AND METHODS USING COMPOSITE AND MIXED IMAGES

BACKGROUND OF THE INVENTION

1. Field of the Invention

The present invention relates to apparatus and methods pertaining to three-dimensional display systems.

2. Description of the Prior Art

Stereoscopic films are known. Such films may comprise a double row of left and right images, or a single row of alternate left and right images which have been photographed from horizontally aligned left and right points of origin. Prior art three-dimensional systems typically operate upon the principle that left and right eye images must remain separated in order to create a stereoscopic effect. These "binocular" systems therefore employ red and green colored glasses, mechanical viewers, or polarized filters in order to assure that only the left eye images reach the left eye and the right eye images reach the right eye. Although results from such systems can be spectacular, the need for extraneous viewing equipment has led to the commercial demise of all such systems. Furthermore, none of these systems is capable of displaying a three-dimensional illusion using simply a standard home television receiver.

The history of prior art three-dimensional systems occasionally includes mention of a "monocular" or "cyclopean" system, in which alternately left and right images were rapidly displayed in an effort to create a three-dimensional illusion through "fusion" of the two images. Complicated multi-film projectors were utilized to implement such systems, left and right images were taken simultaneously on a single film strip to facilitate registration, and speeds of 48 frames per second were tried. None of these systems achieved any significant commercial success and none was deemed capable of displaying a three-dimensional illusion using simply a standard home television receiver.

A successful three-dimensional system is disclosed and claimed in U.S. Pat. No. 4,429,328 entitled "Three-Dimensional Display Methods Using Vertically Aligned Points of Origin", by LeConte Cathey, A. Porter McLaurin and the inventor of the present application. The content of this patent is hereby expressly incorporated by reference into this application. In this system a three-dimensional illusion is generated by sequentially displaying an image of an object alternately from a first point of origin and then, time displaced, from another point of origin at a rate within a range of 4 to 30 changes between the points of origin per second. The illusion of depth is maximized in the '328 patent by having the points of origin vertically aligned with respect to one another. The '328 patent discloses an electronic apparatus using 4 to 30 changes in point of origin per second. The result is an effective and pleasing three-dimensional illusion of the object. Moreover, this three-dimensional illusion may be shown on a standard television receiver—without modification to the receiver and without the need for polarizing glasses. Nevertheless, some flicker is occasionally apparent in the picture of this system, even with vertical alignment of the points of origin.

Accordingly, an object of the subject invention is a display system which exhibits a three-dimensional illusion which is pleasing to the eye and does not noticeably flicker.

Another object of the subject invention is a display system which exhibits a flickerless three-dimensional illusion using a standard, unmodified home television receiver as a means for display.

Yet another object of the subject invention is a display system which exhibits a three-dimensional illusion in which a flickerless representation of the images to be displayed may be recorded on a standard video tape.

A further object of the subject invention is a display system which exhibits a flickerless three-dimensional illusion in which the images to be displayed are either created and/or stored in the memory bank of a computer of the type employed in video games which are today becoming commercially popular.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a method for producing a three-dimensional illusion of a subject comprises the step of sequentially displaying on a viewing surface images of the subject formed alternately of a first series of M first type of picture frames and a second series of N second type of picture frames at a rate within a range of 4 to 30 changes between said first and second series of frames per second, the first series of M first type of picture frames comprising a series of first and second interlaced fields, the first fields of the first series of the first type of picture frames representing images of the subject as viewed from one point of origin and the second fields of the first series of first type of picture frames representing images of the subject as viewed from another point of origin; and the second series of N second type of picture frames comprising a series of first and second interlaced fields, the first fields of the second series of second type of picture frames representing images of the subject as viewed from the another point of origin and the second fields of the second series of second type of picture frames representing images of the subject as viewed from the one point of origin.

In an alternate embodiment of the invention, a method for producing a sequence of output picture frames representing a three-dimensional illusion of a subject, each of the picture frames including a first field of parallel scan lines interlaced with a second field of parallel scan lines comprises the steps of generating first images of the subject as viewed from one point of origin; generating second images of the subject as viewed from another point of origin; selectively composing a sequence of composite picture frames from the first and second images by alternating, at a rate of 4 to 30 changes per second, a first series of M picture frames comprising a series of first and second interlaced fields, the first fields of the first series of picture frames comprising the first images and the second fields of the first series of picture frames comprising the second images, and a second series of N picture frames comprising a series of first and second interlaced fields, the first fields of the second series of picture frames comprising the second images and the second fields of the second series of picture frames comprising the first images; and mixing the sequence of composite picture frames with picture frames comprising the first images to produce the series of output picture frames having as a component the composite picture frames and having as a substantial and continuously present component the first images.

In yet another alternate embodiment of the invention, a method for producing a three-dimensional illusion of a subject comprises the step of selectively composing images of the subject as viewed alternatively first from one point of origin and then from another point of origin at a rate within a range of 4 to 30 changes between the points of origin per second; and mixing the selectively composed images with images of the subject from the one point of origin to produce an output series of picture images having as a component the selectively composed images and having as a substantial and continuously present component the subject as viewed from the one point of origin.

The instant invention further contemplates a three-dimensional imaging apparatus for producing a sequence of picture frames representing a three-dimensional illusion of a subject, each of the picture frames including a first field interlaced with a second field, the apparatus comprising means for producing first images of the scene as viewed from one point of origin and second images of the scene as viewed from another point of origin; and means coupled to said producing means for generating the sequence of picture frames by alternating (a) a first series of M picture frames comprising a series of first and second interlaced fields, each of the first fields of the first series of picture frames corresponding to the first images and each of the second fields of the first series of picture frames corresponding to the second images and (b) a second series of N picture frames comprising a series of first and second interlaced fields, each of the first fields of the second series of picture frames corresponding to the second images and each of the second fields of the second series of picture frames corresponding to the first images, at a rate within a range of 4 to 30 changes between the first and second series of frames per second.

As an additional feature of the apparatus, a video mixer is provided having a first input terminal for receiving the sequence of picture frames, a second input terminal for constantly receiving the first images, and an output terminal for outputting a sequence of mixed picture frames having as a substantial and continuously present component the first images received at the second input terminal.

Another embodiment of the invention comprises a three-dimensional imaging apparatus for producing a sequence of mixed picture frames representing a three-dimensional illusion of a subject comprising means for selectively composing images of the subject as viewed alternatively first from one point of origin and then from another point of origin at a rate within a range of 4 to 30 changes between the points of origin per second; and video mixer means having a first input terminal for receiving the composed images and a second input terminal for continuously receiving the first images, for outputting the sequence of mixed picture frames, each of the mixed picture frames having as a component the composed images and having as a substantial and continuously present component the first images.

BRIEF DESCRIPTION OF THE DRAWINGS

The accompanying drawings, which are incorporated in and constitute a part of the specification, illustrate a preferred embodiment of the invention and, together with the general description of the invention given above and the detailed description of the preferred embodiments given below, serve to explain the principles of the invention.

FIG. 1 is a block diagram of the basic interconnection of cameras in a system incorporating the features of the subject invention;

FIG. 2 illustrates the position of two video cameras in accordance with a preferred embodiment of the invention;

FIG. 3 illustrates a side view of the camera position shown in FIG. 2;

FIG. 4 illustrates a rear view of the camera position illustrated in FIG. 2;

FIG. 5 is a block diagram of a dual video camera system incorporating the features of the subject invention;

FIG. 6(a) is a diagram of a pulse generator circuit used in the system of FIG. 5;

FIG. 6(b) is a waveform diagram of the output of the pulse generator of FIG. 6(a);

FIG. 7(a) is a diagram of an alternate embodiment of the pulse generator;

FIG. 7(b) is a waveform diagram of the output of the pulse generator of FIG. 7(a);

FIG. 8 is a diagram of a video switch circuit used in the system of FIG. 5;

FIG. 9 is a block diagram of a computer incorporating the features of the subject invention; and FIG. 10 is a block diagram of an alternate embodiment of the dual video camera system of FIG. 8.

DETAILED DESCRIPTION

The subject invention comprises methods and apparatus for presenting an illusion of a subject which is perceived by the viewer to be three-dimensional when viewed with the unaided eye. The viewing mechanism may be a standard television whereby the illusion comprises images which may be generated by conventional television cameras. In addition, the illusion may be generated by a computer and/or stored in a computer memory and generated by television techniques for display by a video screen in the manner commonly practiced with video games.

Referring now to the drawings, in FIG. 1 there is illustrated a first video camera 10, a second video camera 12, a switching network 14, a pulse generator 16, and a television monitor 18. The outputs of the cameras 10 and 12 are selectively coupled by the switching network 14 to the monitor 18. In this manner, the monitor 18 displays the image viewed by whichever of camera 10 or camera 12 is, at the moment under consideration, connected by the switching network 14 to the input of the monitor 18. The frequency of operation of the switching network 14 is governed by the output of the pulse generator 16.

As shown in FIG. 1, the cameras 10 and 12 are both directed at a scene or subject 20. The camera 10 views the subject 20 from a point of origin 22 which, for purposes of this invention, is generally and broadly defined as the optical axis of the input lens of the camera 10. The camera 12 views the same scene or subject 20 from a different point of origin 24 defined by the optical axis of the input lens of the camera 12. By alternately connecting the outputs of the cameras 10 and 12 to the input of the monitor 18, through the operation of the switching network 14, the monitor 18 displays images of the subject 20 as viewed alternately first from one point of origin 22 and then, time displaced, from a different point of origin 24.

In a conventional television or cathode ray tube monitor, a picture frame is formed by traversing an electron beam very quickly in a succession of parallel horizontal scans from the top to the bottom of the monitor screen. The actual practice is to divide each picture frame into two fields. The first field comprises every odd numbered horizontal scan line and is followed immediately by a second field wherein a traverse of every even numbered horizontal scan line is made. Synchronization pulses are produced by the cameras at the start of the scan of each field.

Using the apparatus and method of the '903 application, when generating picture frames for display on a television monitor, each picture frame comprises two fields representing images of the subject taken from the same point of origin. Referring to FIG. 1, which is identical to FIG. 1 in this application, the camera 10 is considered to output a picture frame A comprised of fields $a_1$ and $a_2$, and the camera 12 is considered to output a picture frame B comprised of fields $b_1$ and $b_2$. The fields $a_1a_2$ and $b_1b_2$ correspond to images of the subject 20 produced by the cameras 10 and 12, respectively. Thus, for example, a rate of change between points of origin equal to 10 per second, with the cameras 10 and 12 outputting fields at a rate of 60 hertz, requires the switching network to output a sequence of picture frames comprised of fields $a_1a_2a_1a_2a_1a_2$ $b_1b_2b_1b_2b_1b_2$ $a_1a_2a_1a_2a_1a_2$ $b_1b_2b_1b_2b_1b_2$ etc.

One aspect of the instant invention departs from the operation of the method and system of the '902 and '903 applications by producing a sequence of picture frames comprising a first series of M first type of picture frames comprising a series of first and second interlaced fields, the first fields representing images of the subject as viewed from one point of origin and the second fields representing images of the subject as viewed from another point of origin, alternated with a second series of N second type of picture frames comprising a series of first and second interlaced fields, the first fields representing images of the subject as viewed from the another point of origin and the second fields representing images of the subject as viewed from the one point of origin. The first and second series of picture frames are alternated at a rate within a range of 4 to 30 changes per second, preferably in a range of 6 to 15 changes per second, and most preferably 10 changes per second.

For example, a sequence of picture frames generated in accordance with one aspect of the instant invention would comprise a sequence of first type of picture frames having fields such as $a_1b_2a_1b_2a_1b_2$ and a second type of picture frames having fields such as $b_1a_2b_1a_2b_1a_2$. In this example, there is a rate of change between the first and second series of picture frames of 10 hertz, i.e., 10 changes per second, assuming that the cameras output fields at a rate of 60 hertz.

The alternating of series of different types of picture frames including interlaced fields generated from different points of origin, as described above, produces a high quality, stable three-dimensional illusion of a subject without noticeable flicker.

As a second aspect of the present invention, a special effects generator is employed to mix either a series of picture frames having interlaced or non-interlaced fields continuously with picture frames generated by the camera 10 or the camera 12 to produce a mixed series of picture frames each having a substantial and continuously present component of picture frames generated from the one point of origin, i.e., the camera 10, or the another point of origin, i.e., the camera 12.

The precise distance that should be provided between the points of origin of the cameras 10 and 12 depends upon the distance from the cameras to the subject 20. As a general rule, the greater the distance from the cameras 10 and 12 to the subject 20 the greater the spacing should be between the cameras 10 and 12. The following table gives some camera separation distances which are believed to be suitable for different combinations of focal lengths and distances to the subject.

| LENS FOCAL LENGTH | SUBJECT DISTANCE IN FEET | | | | | |
|---|---|---|---|---|---|---|
| | 125 | 150 | 200 | 250 | 300 | 350 |
| 25 mm | 1.75 | 2.4 | 3.3 | 4.2 | 4.8 | 5.3 |
| 50 mm | 3.6 | 4.2 | 5.2 | 6.0 | 6.6 | 7.1 |
| 100 mm | 4.8 | 5.4 | 6.4 | 7.1 | 7.7 | 8.2 |

Vertical orientation of the points of origin is preferred as noted in the '902 and '903 applications. However, vertical orientation is not required for the subject invention.

In FIGS. 2, 3, and 4 the cameras 10 and 12 are shown arranged side-by-side with the optical axes 22 and 24 of the cameras 10 and 12, respectively, substantially parallel to one another and separated by the a distance 26. The camera 10 is aligned to receive optical images reflected from a one hundred percent reflecting mirror 28, while the camera 12 is aligned to receive optical images through a two-way mirror 30. The surfaces of the mirrors 28 and 30 are positioned parallel to one another and at a 45 degree angle to the optical axes 22 and 24 of the cameras 10 and 12, respectively. However, as is best shown in FIGS. 3 and 4, the optical axis 22 is located at a distance 32 above the optical axis 24. Accordingly, the optical axes of the cameras 10 and 12 lie effectively in the same vertical plane, but lie in horizontal planes vertically separated from one another by the distance 32.

One simple example of an apparatus for satisfactorily mounting the cameras 10 and 12 is a tripod head adjustable vertically and rotatably about the vertical axis as well as being adjustable for fore/aft tilt and left/right tilt. Such a tripod is sold by Modern Builders Co. of Chicago, Ill. under the name Majestic Model H-124.

The schematic block diagram of FIG. 5 shows one illustrative example of an electronic circuit suitable for use in connection with the present invention. In FIG. 5 the video outputs of the cameras 10 and 12 are coupled to the input of the switching network 14 having a video output terminal 54. The Q output of a flip-flop 60 is coupled to an enable terminal 56 of the switching network 14.

The switching network 14, the flip-flop 60, and the pulse generator 16, provide means for alternately coupling the output signal from each of the video cameras 10 and 12 one at a time to the output terminal 54. The output terminal 54 may, for example, be coupled to the input of the monitor 18 (FIG. 1) so that the monitor 18 provides a display mechanism for converting the output signals from the cameras 10 and 12 at terminal 54 into a visual display.

Although optical elements such as mirrors are illustrated as being utilized in the arrangement shown in FIGS. 2-4, it is to be understood that a lens system, a prism system, or any equivalent optical arrangement is to be deemed equivalent to the specific mirror system illustrated. Moreover, if the cameras employed are small enough, it is possible that the lenses may be set at the appropriate optical interrelationship with respect to one another, without any intervening apparatus other than the lenses of the cameras themselves. The lenses of the cameras themselves are, in such instances, the means for providing the first camera with the image of the subject as viewed from one point of origin and the second camera with the image of the subject as viewed from another point of origin. Each of the cameras 10 and 12 generates a vertical synchronization signal at the start of a video scan. In order that the vertical synchronization signals utilized by each camera are themselves synchronized it is possible to use the vertical synchronization pulses generated by one camera, such as the camera 10, to drive the output of the other camera, such as the camera 12, in synchrony. Alternatively, vertical synchronization signals generated exteriorly of either the cameras 10 and 12 can be utilized to drive the outputs of the cameras in synchrony.

The camera fields of view are adjusted so as to place the images in registry at some plane in the field of view of the cameras. This necessitates adjustment of the cameras so that the parallax seen on a viewing television screen is zero at some distance from the cameras. Adjustment of the cameras can easily be made while viewing the resultant images on the television. The correct adjustment is sensed when there is no motion of objects between images recorded by the camera 10 and the camera 12 at the desired distance. The mind of the viewer will then sense a depth to the picture formed of the camera 10 and 12 views.

In practicing the first aspect of the present invention, the circuit of FIG. 5 selects a first series of M first type of picture frames comprising a series of first and second interlaced fields, the first fields of the first type of picture frames represent images outputted by the camera 10 and the second fields of the first type of picture frames represent images outputted by the camera 12. The first series of picture frames are alternated with a second series of N second type of picture frames comprising a series of first and second interlaced fields. The first fields of the second type of picture frames represent the images outputted by the camera 12 and the second fields of the second type of picture frames represent the images outputted by the camera 10.

For M and N equal to 3, the images outputted from the camera 10 being identified as fields $a_1$ and $a_2$, and the images outputted from camera 12 being identified by the fields $b_1$ and $b_2$, a sequence of full frames of the first type would be the repetitive image pattern of $a_1b_2a_1b_2a_1b_2$. The full frames of the second type would be the repetitive image pattern of $b_1a_2b_1a_2b_1a_2$. This repetitive image pattern corresponds to a frequency of 10 hertz when the television receiver 18 completes a field scan in 1/60 of a second. It is contemplated that values of M and N both equal to 2 and 4, corresponding to frequencies of 15 hertz and 7.5 hertz, respectively, as well as other frequencies can be used in the above-explained first mode of operation. It is also within the scope of this invention to have M and N unequal to each other.

A scan rate of sub-multiples of 60 hertz is dictated by the standardization of commercial television under 60 hertz line frequency in the United States. If a closed circuit system is used independently of the commercial television system, such as in a computerized video game, then any frequency in the range from about 4 to 30 hertz, and preferably in the range of 6 to 15 hertz, and most preferably 10 hertz for the operation of flip-flop 60 should be satisfactory.

With reference to FIG. 6(a), the pulse generator 16 includes an input terminal 80 receiving the vertical synchronization pulse generated by the television camera at the start of each field scan. The synchronization pulse switches on a transistor 82 which supplies the pulse over a signal line 100 to a first input of an EXCLUSIVE OR gate 98 and triggers the input of a flip-flop 84. The output of the flip-flop 84 is connected as one input to a down counter 86. The $\bar{Q}$ output of the flip-flop 84 is recycled to a second input of the flip-flop 84. As a result, every other vertical synchronization pulse results in a pulse being supplied as an input to the counter 86. In other words, the content of the counter 86 is decremented once per picture frame.

The outputs of the counter 86 are connected to a first NOR gate 88 and a second NOR gate 90. The outputs of the NOR gates 88, 90 are supplied as inputs to respective inverters 92 and 94. The outputs of the inverters 92 and 94 are individually supplied to first and second input terminals, respectively, of a NOR gate 96. The output of the NOR gate 96 is supplied to a second input terminal of the EXCLUSIVE OR gate 98. The output of the EXCLUSIVE OR gate 98 is supplied as an input to the flip-flop 60.

In operation, the counter 86 is operated in a down-count mode with the content thereof being decremented by one for each full frame to be generated. When the content of the counter 86 has been decremented to zero, the inputs to the NOR gates 88 and 90 will be ZERO generating a ONE output by each of the NOR gates 88, 90. The inverters 92, 94 output ZERO values which are supplied as inputs to the NOR gate 96. When the NOR gate 96 receives a ZERO input on each of the first and second input terminals, a ONE output will be generated and supplied to the second input terminal of the EXCLUSIVE OR gate 98.

The first input terminal of the EXCLUSIVE OR gate 98 receives each synchronization pulse. Accordingly, a ONE output will be generated by the EXCLUSIVE OR gate 98 whenever the content of the down counter 86 is not equal to ZERO. A ONE output of the EXCLUSIVE OR gate 98 will cause a pulse to be generated at the Q output of the flip-flop 60. As long as a ONE input is supplied to the flip-flop 60, the Q output will alternate between HIGH (ONE) and LOW (ZERO) values. If the input to the flip-flop 60 is LOW (ZERO) the value of Q will not change.

When the counter 86 has been decremented to ZERO, the EXCLUSIVE OR gate 98 will produce a ZERO pulse inhibiting a change in state for the Q output of the flip-flop 60 until the counter 86 is reset. In this manner, the counter 86 operates as a delay element and will result in a series of $M-1$ full frames comprising one of the first images from the camera 10 and one of the second images from the camera 12 followed by a full frame of either camera 10 or camera 12 and then $M-1$ full frames comprising one of the second images from the camera 12 and one of the first images of the camera 10. In this instance M−1 is the value to which the counter 86 is reset.

FIG. 6(b) is a timing diagram for the output of the flip-flop 60 when M has been selected to be six to give a switching rate of 5 hertz. When the output Q has a HIGH value, the switching network 14 will select as an input the image generated by the camera 10. Conversely, when the Q output of the flip-flop 60 has a LOW value, the switching network 14 will select the image outputted by the camera 12. The operation of the switching network 14 will be described hereinafter.

Referring to FIG. 6(b), the Q output is initially a LOW value for two synchronization pulses signifying a full frame to be generated comprising images outputted by the camera 12. This full frame is followed by five full frames of interlaced fields wherein the first field of each full frame corresponds to an image outputted by the camera 10 and the second field of each full frame corresponds to an image outputted by the camera 12.

Following these frames, the counter 86 is decremented to a ZERO value resulting in a full frame of two fields corresponding to the image outputted by the camera 10 to be generated as the counter 86 is reset. Five full frames of interlaced fields are then generated wherein the first field corresponds to the image outputted by the camera 12 and the second field corresponds to the image outputted by the camera 10. This pattern is repeated to generate a highly viewer-acceptable three-dimensional image for display on the television monitor 18 or for recording on video tape. It should be understood that values for M different from six can be selected as discussed above.

FIG. 7(a) illustrates an embodiment of the pulse generator 16 suitable for use in implementing the non-interlaced mode of operation of the present invention. In this embodiment a square wave generator 120 supplies a gating signal to a first input terminal of an AND gate 122. A second input terminal of the AND gate 122 receives the vertical synchronization signals generated by either the camera 10 or the camera 12.

As shown in FIG. 7(b) the square wave generator 120 outputs a signal having a HIGH (ONE) value for a period of time equal to the number of full frames to be formed from the images outputted by the camera 10. After that period, the square wave generator 120 outputs a signal having a LOW value for a period of time equal to the number of full frames to be formed from the images outputted by the camera 12. If the rate of change between fields of view is to be 10 hertz then the output of the square wave generator 120 would change values after every three image frames.

FIG. 8 is an embodiment of the switching network 14 and includes an input terminal 102 for receiving the Q output of the flip-flop 60 when practicing the interlaced mode of operation of the present invention or the output of AND gate 122 when practicing the non-interlaced mode of operation of the instant invention. The signal received at the terminal 102 is supplied along parallel paths to a pair of switches. One of the paths includes a pair of series-connected inverters 104 and 106 connected in series to the base of a switching transistor 108. When the Q output is ONE (HIGH), the transistor 108 will conduct causing the image outputted by the camera 10 to be supplied to the television monitor 18 through the video output terminal 54. The second path includes a single inverter 110 having its output connected to the base of a second switching transistor 112. When the signal at terminal 102 is ZERO (LOW), the transistor 112 will conduct enabling the image outputted from the camera 12 to be supplied to the video output terminal 54. Thus, the switching network 14 illustrated in FIG. 8 enables either the images outputted by the first camera 10 or the images outputted by the second camera 12 to be selectively transferred to the video output terminal 54 when practicing the first mode of operation of the present invention.

Furthermore, it is to be understood that the principles of the present invention may be achieved in connection with a television display mechanism, without the use of video cameras. For example, visual computer games which are well known today include a cathode ray tube monitor 70 as shown in FIG. 9, the display on which is governed by operation of a microprocessor 72. The microprocessor 72, as is well-known to those skilled in the art, retrieves stored display data from a memory such as read only memory 74 and causes an image represented by the stored data to appear on the display screen of the monitor 70. The operation of the microprocessor 72 is controlled by a clocking mechanism 76.

In present day video games, the resultant images portray a flat two dimensional illusion. However, if data representing images of a subject as viewed alternately first from one point of origin and then, time displaced, from another point of origin is stored in the ROM 74 and displayed by the microprocessor 72 on the monitor 70 at a rate within a range of 4 to 30 individual viewings per second, a standard video game could be made to be presented as a three-dimensional illusion.

Alternatively, in the interlaced mode of operation of the present invention, the computer may generate a first series of picture frames comprising M first type of picture frames comprising a series of first and second interlaced fields, the first fields of the first series of picture frames representing images of the subject as viewed from one point of origin and the second fields of the first series of picture frames representing images of the subject as viewed from another point of origin. The computer also generates a second series of picture frames comprising N second type of picture frames comprising a series of first and second interlaced fields, the first fields of the second series of picture frames representing images of the subject as viewed from the another point of origin and the second fields of the second series of picture frames representing images of the subject as viewed from the one point of origin. The first and second series of picture frames are alternately provided from the ROM 74 to the monitor 70 at a rate within a range of 4 to 30 changes per second.

As is true when employing the subject invention in connection with standard television cameras, it is preferable, but not necessary, that it appear that the points of origin of the images represented by data stored in ROM 74 are vertically displaced with respect to one another. Furthermore, it is preferable that the range of operation be between 6 and 15 changes in apparent points of origin per second, and most preferably about 10.

The computer generated method creates three-dimensional illusions for display on cathode ray tube (CRT) screens which can be observed directly without the need for special glasses or other visual aids. The computer generated method is not limited to CRT devices, but could also be used with liquid crystal, electroluminescent, fluorescent or other type devices capable of displaying computer generated images.

The images are generated by conventional means which may include the monocular cues of perspective, interposition, size, texture, gradient, etc. The alternating views differ slightly from each other because of changes of apparent point of origin. These changes may be generated by any of several techniques. Successive images are computed and displayed from alternating viewpoints.

One method for achieving such changes is by computing the position of the chosen object or scene spatially rotated slightly about an axis lying in the plane of the CRT screen (or other display device). Successive images alternate back and forth between the two rotated images. Alternate images will then show the object or scene from slightly different points of view which will be interpreted by the viewer as one image with depth. For a single object, the images should coincide at some point, that is, the rotation axis should pass through the object displayed. The angle of rotation should be kept small, typically on the order of a few degrees of arc, sometimes even less than one degree of arc. The rotation axis may lie in the foreground, midground, or background depending on the effect desired.

For two or more objects displayed, the entire scene should be displayed as spatially rotated about a single axis. The amount of motion of each object will depend on the distance of the object from the rotation axis. The rotation axis may be aligned in any direction in the plane of the screen including vertical, horizontal, diagonal, or any combination thereof. The preferred orientation is horizontal with the resulting parallactic motion in a vertical direction, but any other orientation can be used.

In addition to rotations, the effect of parallax can be created by selective translation of the image in whole wherein the amount of translation is proportional to the apparent computed distance from the background, or equivalently, proportional to the apparent or computed distance from the observer. For small motions, translations of this type are equivalent to rotations. Translational motions may have special usefulness with certain computers in which image information can be selectively stored in separate registers so that objects at different apparent depths could be stored in separate locations and corresponding translational amplitudes could then be assigned.

The exact choice of program (or software) to be utilized depends on the particular choice of computer and its display hardware would be readily apparent to one of ordinary skill in the art. In particular, the process can be adapted for two distinct display modes: raster (or TV) scan display and vector (or calligraphic) display. Systems with vector display typically use computers that are sufficiently large and fast to enable the computation and display of the images as described above. Home type microcomputers can also be used to display the three-dimensional images once the information is computed and stored in its memory so that an entire screen image may be recalled in a single video scan. This technique of calling up full screen images successively is known as page flipping. Alternate images could be computed as slowly as need be and then be stored in the computer's memory. Alternate pages are then called up (or flipped) at the appropriate frequency of about 10 hertz.

The parallax induction process is not limited to only two views of an object. It may also be applied to a succession of views so as to incorporate animation or motion as is already common in computer generated images. This could include images for computer games in which objects move through a three-dimensional scene generated by the parallax technique.

Computer generated images which are drawn on paper may also be used to create images in depth if they are successively photographed or videotaped so that when projected or played back they are displayed at the proper frequency of about 10 hertz. Thus the effect is not restricted to real-time display devices.

FIG. 10 illustrates an embodiment of the dual video camera system of FIG. 5 for practicing the second aspect of the present invention. The modification in FIG. 8 comprises the addition of a special effects generator(-SEG)/mixer 124 receiving as inputs the outputs of switching network 14 at a first input terminal and the outputs of the camera 10 at a second input terminal.

The output of the SEG/mixer 124 is supplied as an input to the television monitor 18. In operation, the SEG/mixer 124 generates output video images having as one component the outputs of the switching network 14 and as another substantial and continuously present component the image generated by the camera 10. When the switching network 14 operates in the interlace mode to produce, for example, an $a_1b_2a_1b_2a_1b_2 b_1a_2b_1a_2b_1a_2 a_1b_2a_1b_2a_1b_2$ ... output, then the mixer 124 output is $[x(a_1b_2)+y(a_1a_2)]+[x(a_1b_2)+y(a_1a_2)]$ ... $[x(b_1a_2)+y(a_1a_2)]$ ... where x is the percentage, as determined for the mixer 124 of the signal received at the first input terminal of the mixer 124, and y is the percentage, as determined by the mixer 124, of the signal received at the second input terminal of the mixer 124. Preferably x and y are between 40 and 60 percent.

When the switching network 14 operates in a non-interlace mode to produce, for example, an $a_1a_2a_1a_2a_1a_2 b_1b_2b_1b_2b_1b_2 a_1a_2a_1a_2$ ... output, then the mixer 124 output is $[x(a_1a_2)+y(a_1a_2)]+$ ... $+[x(b_1b_2)+y(a_1a_2)]$ In either case the output of the camera 10 provides a substantial and continuously present component of the output of the mixer 124, which steadies the output. The addition of the SEG/mixer 124 further enhances the three-dimensional illusion of the picture displayed on the television monitor 18 and reduces undesirable motion in the generated picture.

A suitable SEG/mixer is the Panasonic Model WJ-4600A. The use of such a SEG/mixer is particularly effective in eliminating flicker in the video image due to jumping between points of origin.

The techniques of the subject invention basically utilize the eye and brain's ability to perceive stereopsis through the merging of two or more separate images in a manner which may be referred to as cyclopean perception. The key requirement is the need to give the brain two separate images. Conventionally the two images are received simultaneously through separate parallel inputs—the two eyes—and mixed in the brain. However, the subject invention presents the two images sequentially and the brain mixes the images using a short term memory storage capacity inherent within the brain. Since both eyes receive the same input, no special glasses are required. In fact, closing one eye makes no change in the perceived depth. The image can be seen by people with only one eye and can also be seen, transmitted, and recorded with single-camera television systems. If the camera zooms in to a reduced portion of the image, and then pans across the scene, a very strong illusion of real movement is created. Similarly, zooming in to a small portion of the image does not change the effect and the apparent motion into the scene is enhanced.

While particular embodiments of the present invention have been shown and described, it will of course be obvious to one skilled in the art that certain advantages and modifications can be effected without the departing from the spirit of the invention, such as the utilization of more than two cameras to create a stereoscopic effect. Accordingly, it is intended that the scope of the invention not be determined by the foregoing examples, but only by the scope of the appended claims.

What is claimed is:

1. A method for producing a three-dimensional illusion of a subject comprising the step of sequentially displaying on a viewing surface images of the subject as formed alternately of a first series of a first type of picture frames and a second series of a second type of a picture frames at a rate within a range of 4 to 30 changes between said first and second series of picture frames per second, said first type of picture frames comprising at least two interlaced images of said subject as viewed from different points of origin and said second type of picture frames comprising at least two interlaced images of said subject as viewed from different points of origin, said images of said first type of picture frames being different in order of point of origin from said second type of picture frames.

2. A method for producing a three-dimensional illusion of a subject comprising the step of sequentially displaying on a viewing surface images of the subject formed alternately of a first series of M first type of picture frames and a second series of N second type of picture frames at a rate within a range of 4 to 30 changes between said first and second series of frames per second, said first series of M first type of picture frames comprising a series of first and second interlaced fields, said first fields of said first series of said first type of picture frames representing images of the subject as viewed from one point of origin and said second fields of said first series of said first type of picture frames representing images of the subject as viewed from another point of origin; and said second series of N second type of picture frames comprising a series of first and second interlaced fields, said first fields of said second series of said second type of picture frames representing images of said subject as viewed from said another point of origin and said second fields of said second series of said second type of picture frames representing images of said subject as viewed from said one point of origin.

3. A method for producing a sequence of picture frames representing a three-dimensional illusion of a subject, each of the picture frames including a first field of parallel scan lines interlaced with a second field of parallel scan lines, the method comprising the steps of:
generating first images of the subject as viewed from one point of origin;
generating second images of the subject as viewed from another point of origin; and
selectively composing said sequence of picture frames from said first and second images by alternating at a rate of 4 to 30 changes per second a first series of M picture frames comprising a series of first and second interlaced fields, said first fields of said first series of picture frames comprising said first images and said second fields of said first series of picture frames comprising said second images and a second series of N picture frames comprising a series of first and second interlaced fields, said first fields of said second series of picture frame comprising said second images and said second fields of said second series of picture frames comprising said first images.

4. A method for producing a sequence of output picture frames representing a three-dimensional illusion of a subject, each of the picture frames including a first field of parallel scan lines interlaced with a second field of parallel scan lines, the method comprising the steps of:
generating first images of the subject as viewed from one point of origin;
generating second images of the subject as viewed from another point of origin;
selectively composing a sequence of composite picture frames from said first and second images by alternating, at a rate of 4 to 30 changes per second a first series of M picture frames comprising a series of first and second interlaced fields, said first fields of said first series of picture frames comprising said first images and said second fields of said first series of picture frames comprising said second images and a second series of N picture frames comprising a series of first and second interlaced fields, said first fields of said second series of picture frames comprising said second images and said second fields of said second series of picture frames comprising said first images; and
mixing said sequence of composite picture frames with picture frames comprising said first images to produce said series of output picture frames having as a component said composite picture frames and having as a substantial and continuously present component said first images.

5. A method for producing a three-dimensional illusion of a subject comprising the steps of:
selectively composing images of the subject as viewed alternatively first from one point of origin and then from another point of origin at a rate within a range of 4 to 30 changes between said points of origin per second; and
mixing said selectively composed images with images of said subject from said one point of origin to produce an output series of picture images having as a component said composed images and having as a substantial and continuously present component said images of said subject as viewed from said one point of origin.

6. A method according to claim 2, 3, or 4 wherein said fields occur at a rate of 60 hertz and wherein M and N are each equal to 1.

7. A method according to claim 2, 3, or 4 wherein said fields occur at a rate of 60 hertz and wherein M and N are each equal to 2.

8. A method according to claim 2, 3 or 4 wherein said fields occur at a rate of 60 hertz and M and N are each equal to 3.

9. A method according to claim 2, 3, or 4 wherein said fields occur at a rate of 60 hertz and M and N are each equal to 4.

10. A method according to claim 2, 3, 4 or 5 wherein said rate is between 6 and 15 changes per second.

11. A method according to claim 2, 3, 4 or 5 wherein said rate is about 10 changes per second.

12. A three-dimensional imaging apparatus for producing a sequence of picture frames representing a three-dimensional illusion of a subject, each of the picture frames including a first field interlaced with a second field the apparatus comprising:

means for producing first images of the scene as viewed from one point of origin and second images of the scene as viewed from another point of origin; and means coupled to said producing means for generating said sequence of picture frames by alternating (a) a first series of M picture frames comprising a series of first and second interlaced fields, each of said first fields of said first series of picture frames corresponding to said first images and each of said second fields of said first series of picture frames corresponding to said second images and (b) a second series of N picture frames comprising a series of first and second interlaced fields, each of said first fields of said second series of picture frames corresponding to said second images and each of said second fields of said second series of picture frames corresponding to said first images, at a rate within a range of 4 to 30 changes between said first and second series of frames per second.

13. An imaging apparatus according to claim 12 wherein said producing means comprises a computer system for selectively supplying said first images and second images, said second images comprising a spatial rotation of said first images to give the appearance of said different points of origin for said first and second images.

14. An imaging apparatus according to claim 12 wherein said producing means comprises a first camera effectively located at said one point of origin and a second camera effectively located at said another point of origin spaced from said one point of origin.

15. An imaging apparatus according to claim 14 wherein said apparatus further includes an output terminal and wherein said generating means comprises:

a pulse generator for generating a transfer pulse associated with each of said fields of each of said picture frames, each said transfer pulse having a first value when a said first image is to be represented in said fields of said picture frames and a second value when a said second image is to be represented in said fields of said picture frames; and a video switch for transferring either said first image or said second image to said output terminal responsive to the value of each of said transfer pulses.

16. An imaging apparatus according to claim 15 wherein said first and second cameras utilize vertical synchronization signals associated with each image and wherein said pulse generator comprises:

an input terminal receiving said vertical synchronization signals;

an output flip-flop for generating each transfer pulse;

means for triggering said output flip-flop to generate output pulses alternating between said first value and said second value responsive to said vertical synchronization signals; and means for selectively inhibiting said triggering means such that said output flip-flop produces successive transfer pulses having said first value or said second value to control said video switch to transfer to said output terminal a picture frame having first and second fields of either said first image or said second image.

17. An imaging apparatus according to claim 12 further including video mixer means, having a first input terminal coupled to the output of said generating means for receiving said sequence of picture frames and a second input terminal for receiving said first images from said producing means, for outputting a sequence of mixed picture frames, each of said mixed picture frames having as a component said sequence of picture frames and having as a substantial and continuously present component said first images.

18. A three-dimensional imaging apparatus for producing a sequence of mixed picture frames representing a three-dimensional illusion of a subject, comprising:

means for selectively composing images of the subject as viewed alternatively first from one point of origin and then, from another point of origin at a rate within a range of 4 to 30 changes between said points of origin per second; and video mixer means, having a first input terminal for receiving said composed image and a second input terminal for continuously receiving said images from said one point of origin for outputting said sequence of mixed picture frames, each of said mixed picture frames having as a component said composed images and having as a substantial and continuously present component said images from said one point of origin.

* * * * *